United States Patent
Bang et al.

(10) Patent No.: US 7,633,880 B2
(45) Date of Patent: Dec. 15, 2009

(54) ACCESS NETWORK DEVICE FOR MANAGING QUEUE CORRESPONDING TO REAL TIME MULTIMEDIA TRAFFIC CHARACTERISTICS AND METHOD THEREOF

(75) Inventors: Jong-ho Bang, Suwon-si (KR); Se-Jong Oh, Anyang-si (KR); Ji-hoon Lee, Cheongju-si (KR); Sung-hyuck Lee, Nam-gu (KR); Seong-ho Jeong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 935 days.

(21) Appl. No.: 11/029,024

(22) Filed: Jan. 5, 2005

(65) Prior Publication Data

US 2005/0232154 A1    Oct. 20, 2005

(30) Foreign Application Priority Data

Jan. 5, 2004    (KR) ...................... 10-2004-0000428

(51) Int. Cl.
H04L 12/26    (2006.01)
H04L 12/28    (2006.01)

(52) U.S. Cl. ...................................... 370/252; 370/412
(58) Field of Classification Search ....................... None
See application file for complete search history.

(56) References Cited

U.S. PATENT DOCUMENTS

| | | | | |
|---|---|---|---|---|
| 4,569,042 A | * | 2/1986 | Larson ........................ | 370/250 |
| 5,623,483 A | * | 4/1997 | Agrawal et al. ............. | 370/253 |
| 6,104,700 A | * | 8/2000 | Haddock et al. ............ | 370/235 |
| 7,408,879 B2 | * | 8/2008 | Jo et al. ...................... | 370/235 |
| 2003/0067877 A1 | * | 4/2003 | Sivakumar et al. .......... | 370/232 |

* cited by examiner

Primary Examiner—Steven H Nguyen
(74) Attorney, Agent, or Firm—Staas & Halsey LLP (57) ABSTRACT

A queue management method of an access network device includes receiving a packet, determining feasibility of a packet transmission within a delivery deadline allowed from a destination if the received packet is for real-time transmission, storing the packet in the transmission queue and transmitting the packet in sequential order of the storage when the packet transmission within the delivery deadline is feasible, and dropping the packet instead of storing the packet in the transmission queue when the packet transmission is determined infeasible. Accordingly, resources required for the packet transmission are saved.

14 Claims, 4 Drawing Sheets

ACCESS NETWORK DEVICE FOR MANAGING QUEUE CORRESPONDING TO REAL TIME MULTIMEDIA TRAFFIC CHARACTERISTICS AND METHOD THEREOF

CROSS-REFERENCE TO RELATED APPLICATION

This application claims the benefit of Korean Patent Application No. 2004-428 filed on Jan. 5, 2004 in the Korean Intellectual Property Office, the disclosure of which is incorporated herein by reference.

BACKGROUND OF THE INVENTION

1. Field of the Invention

The present invention generally relates to an access network device and a management method thereof. Particularly, the present invention relates to an access network device for managing queue by determining feasibility of real-time transmission within a predetermined time in advance and dropping a packet determined to be infeasible to transmit, and a method thereof.

2. Description of the Related Art

Internet is prevalent all over the world thanks to developments of computer and communication technologies. Much research has been made on wireless Internet systems for active uses of the Internet and computers. The wireless Internet is briefly classified into a wireless stationary Internet and a wireless mobile Internet. The wireless stationary Internet includes systems for wireless LAN (Local Area Network), B-WLL (Broadband Wireless Local Loop), LMDS (Local Multipoint Distribution Service), and Bluetooth. The wireless stationary Internet has limits in mobility, but provides superior transmission capacity and speed. By contrast, the wireless mobile Internet, which is implemented by different types of systems in a notebook computer and PC according to generations of the mobile communication network, provides superior mobility, but has limitations in transmission capacity and speed.

In order to support mobility in such a mobile network, a MIP (Mobile IP) and a QoS (Quality of Service) that secures a reliable transmission of data and multimedia traffic are required. The reliable transmission of the multimedia traffic in wired network environment uses an RSVP (Resource reSerVation Protocol) which reserves network resources in advance.

However, since the present RSVP is not developed in consideration of the mobility, a proper resource reservation cannot be made when the MIP, which is the mobility protocol, is used. Research for the resource reservation in the mobile network is continuously in progress after the introduction of the MIP. The representative protocols of such research include an MRSVP (Mobile RSVP), an RSVP-MP (RSVP Mobility Proxy), and a CORP (a method of Concatenation and Optimization for resource Reservation Path).

Figure 1:
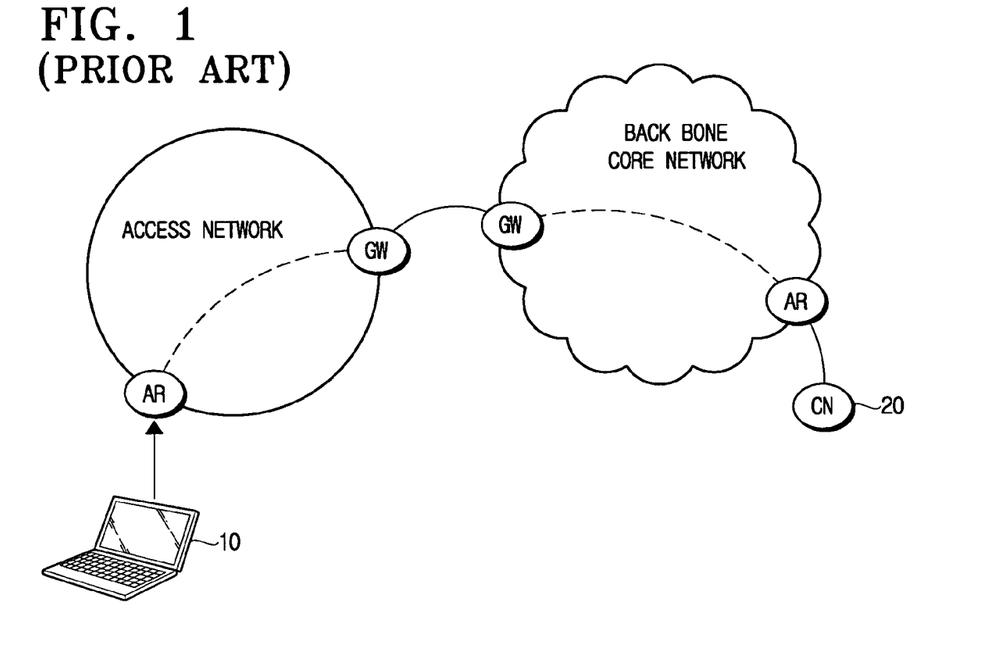
FIG. 1 illustrates a communication between a mobile node and a correspondent node through a wireless access network.

FIG. 1 illustrates a wireless network environment in which a mobile node (MN) 10 is connected to a correspondent node (CN) 20 through an access network and a backbone core network. The MN 10 is generally a notebook computer, a PC, or a mobile phone. The MN 10 accesses the access network through an access router (AR) so as to communicate with other nodes in the access network or with the CN 20 connected through the backbone core network.

The connection through the wireless link of FIG. 1 is superior to that through a wired link in view of the mobility, but has a higher error rate in the packet transmission due to the deterioration of the transmission capability caused by noise, interference and distance.

Basic methods for dealing with errors at a link layer include a forward error correction (FEC) mechanism and an automatic repeat request (ARQ) mechanism. These mechanisms may be separately used to obtain optimum performance, or, used in combination such as a hybrid ARQ.

The FEC mechanism attaches additional data to transmitted packets so that a reception side can recover the losses when there are lost packets. Since the packets are transmitted just one time between a reception terminal and a transmission terminal, the FEC mechanism is suitable for real-time communication. However, since a code for error recovery is additionally required, the additional data prolongs the processing and increases overhead. The FEC mechanism wastes resource bandwidth due to the necessity of transmitting the additional data even when a link status is stable and normal.

The ARQ mechanism determines the loss of packets and retransmits the packets if an acknowledgement (ACK) packet is not received within a predetermined time-out with respect to each packet transmitted from the transmission side. A router, which interconnects networks in Internet protocol (IP)-based wireless network environment, transmits packets to a mobile node and then, retransmits the packets if the ACK packet is not received from the mobile node.

Currently, communications among users are performed more rapidly and the users experience real-time TV broadcasts and videoconferences through PCs. When such real-time communication is required, transmission of real-time packets from the reception side to its destination side has restrictions on time, and thus the packets transmitted to the destination are dropped after the deadline. Specifically, real-time traffic for transmitting packets in real-time receives the packets in real time and utilizes the received packets. Thus, packets beyond a predetermined time after the transmission are dropped and the following packets are utilized.

In the wireless access environment as shown in FIG. 1, the mobile node needs to connect with the AR to access the access network. The AR, which is connected with a certain number of upper routers, forwards packets from the CN 20 to the mobile node 10, or, forwards packets from the mobile node 10 to the CN 20 along a reserved route.

The AR having a transmission queue buffers the received packets in the transmission queue and forwards the received packets to the destination by checking an IP address of the destination contained in a header of the received packets. The queue represents a first-in first-out (FIFO) buffer structure which outputs in a sequential order data stored in a constrained memory area. The transmission queue indicates the queue storing the packet to be transmitted. When the packets to be transmitted are stored in the queue, the packets to be transmitted await in the queue until the firstly stored packets are output.

Packets for real-time transmission are stored in the transmission queue and then, transmitted in a sequential order of their storage. Accordingly, queuing time becomes quite long until the requested packets are transmitted because all prior transmission packets are transmitted first.

If there is a plurality of prior transmission packets and a considerable queuing time is required for the router in the network, total time for transmitting the packets to the destination increases. Consequently, the deadline may expire before the packets arrive at the destination. Such real-time transmission packets beyond the deadline are invalid and thus, the destination drops the packets upon the reception.

In the above conventional arrangement, the packets, which are dropped due to the arrival beyond the deadline in the real-time communication, need to arrive at the destination. Hence, the AR stores the packets in the transmission queue and forwards the packets to the destination, thus wasting resources such as the bandwidth.

This disadvantage becomes worse in the network environment implemented under the ARQ mechanism. For the real-time communication under the ARQ mechanism, the router has the transmission queue for storing the packets to be transmitted to the mobile node at the link layer and also has a retransmission queue for storing a duplicate of the packets to be transmitted. When the ACK packet is received from the mobile node, the related duplicate packet stored in the retransmission queue is removed at once. Packets that are negatively acknowledged (NACK) are moved from the retransmission queue to the transmission queue and are transmitted prior to other packets pre-stored in the transmission queue. Therefore, the retransmission due to such errors requires more time and increases probability to exceed the deadline of the real-time traffic. The resources of the retransmission queue are wasted since the router has both of the transmission queue for the packets and the retransmission queue for the duplicates of the packets.

Efficient queue management methods have not been suggested for dealing with the above disadvantages in the wireless network. Resource management methods based on the queue management suggested for the wired network, such as RED (Random Early Detection), SRED (Stabilized RED), BLUE, and GRED (Gentle RED), do not consider characteristics of the wireless network and are not applicable.

In case of frequency handover in the wireless network environment, both an old AR (OAR) and a new AR (NAR) store the packets, thus wasting resources.

SUMMARY OF THE INVENTION

To address the above disadvantages and/or other problems of the conventional arrangement, an aspect of the present invention provides a router efficiently managing a queue by dropping a packet which arrives at a destination after a deadline, instead of storing the packet in the queue, by checking queue occupancy with respect to real-time traffic, and a method thereof.

According to an aspect of the present invention, the queue management method of an access network device storing a received packet in a transmission queue and transmitting the stored packet to a destination node in a storage order, includes determining whether the packet is transmitted within a delivery deadline allowed for real-time traffic to the destination node and dropping the packet rather than storing the packet in the transmission queue when it is determined that the packet cannot be transmitted within the delivery deadline.

According to another aspect of the present invention, the determination of whether the packet is transmitted includes calculating a maximum queue length allowed in the access network device for the transmission within the delivery deadline, comparing the maximum queue length with a current queue length of the transmission queue, and determining the packet transmission within the delivery deadline to be infeasible if the current queue length is greater than or equal to the maximum queue length.

According to another aspect of the present invention, the calculation of the maximum allowed queue length calculates the maximum queue length using the delivery deadline, a total delay time from the packet transmission until the packet reception, and a transmission rate of the packet.

According to another aspect of the present invention, an access network device according to an ARQ mechanism further includes a retransmission queue storing a duplicate of a packet to be transmitted. Thus, the queue management method further includes storing the packet in the transmission queue when determined that the packet transmission is feasible within the delivery deadline, storing a duplicate of the packet in a retransmission queue separately provided, and transmitting the duplicate stored in the retransmission queue when a response packet indicating the destination node normally receiving the packet has not received the packet within a certain time after the packet transmission. If errors occur while the transmission of the packet, the duplicate is retransmitted so as to perform normal communication.

According to another aspect of the present invention, the retransmission requires additional time. Accordingly, the maximum queue length is calculated by waiting a predetermined period of time before the retransmission.

According to another aspect of the present invention, the access network device accesses other networks or a certain node at an end of a network. The access network device indicates an access router accessing a mobile node and a certain network.

According to another aspect of the present invention, a queue management method of an access network device provides a mobile node with access to a network and, if a packet destined for the mobile node is received, the access network storing the packet in a transmission queue and transmitting the stored packet to the mobile node in a storage order, includes the access network device receiving from the mobile node a handover initiation packet indicating a beginning of a handover when the handover of the mobile node initiates, the access network device transmitting the packet to a new access network device when the packet destined for the mobile node is received after the reception of the handover initiation packet, determining whether the packet transmitted within a delivery deadline allowed for a packet for real-time transmission at the mobile node when the packet is for a real-time packet, and dropping the packet instead of storing the packet in the transmission queue when determined that the packet transmission is infeasible within the delivery deadline.

According to another aspect of the present invention, the determination of whether the packet is transmitted includes calculating a maximum queue length of the access network device for the transmission within the delivery deadline, comparing the maximum queue length with a current queue length of the transmission queue, and determining the packet transmission within the delivery deadline to be infeasible if the current queue length is greater than or equal to the maximum queue length.

According to another aspect of the present invention, the queue management method further includes the access network device receiving from the mobile node a handover completion packet indicating the handover is completed, and dropping a packet instead of storing the packet in the transmission queue when the packet destined for the mobile node is received after the reception of the handover completion packet.

According to another aspect of the present invention, the maximum queue length allowed is calculated using the delivery deadline, a total delay time from the packet transmission until the packet reception, and a transmission rate of the packet.

According to another aspect of the present invention, if the access network devices is used in a network system under the ARQ mechanism, the queue management method further includes storing the packet in the transmission queue when determined that the packet transmission is feasible within the delivery deadline, storing a duplicate of the packet in a retransmission queue separately provided, and transmitting the duplicate stored in the retransmission queue when a response packet indicating the destination node normally receiving the packet has not received the packet within a certain time after the packet transmission.

According to another aspect of the present invention, the maximum queue length allowed is calculated by additionally reflecting a time required for the retransmission.

According to another aspect of the present invention, an access network device managing the queue according to the above queue management method includes a packet input part receiving a packet destined for a certain node, a transmission queue storing the packet received through the packet input part and transmitting the packet in a sequential order of the storage, and a controller dropping the packet instead of storing the packet in the transmission queue when the received packet is for real-time transmission and it is predicted that it is infeasible to transmit the packet within a delivery deadline allowed for the real-time transmission packet from a destination node.

According to another aspect of the present invention, the controller calculates a maximum queue length for the packet transmission within the delivery deadline, compares the calculated maximum queue length with a current queue length, and determines infeasibility of the packet transmission within the delivery deadline if the current queue length is greater than or equal to the maximum queue length.

According to another aspect of the present invention, the controller calculates the maximum queue length using the delivery deadline, a total delay time from the packet transmission until the packet reception, and a transmission rate of the packet.

According to the ARQ mechanism, the access network device further includes a retransmission queue storing a duplicate of the packet and retransmitting the duplicate to the destination node when a response packet indicating the destination node normally receiving the packet has not been received within a certain time. A maximum delayable time is calculated in consideration with the delay time due to the retransmission.

According to another aspect of the present invention, if the access network device is the access router accessing a mobile node and a certain node, when the mobile node initiates a handover, a former access network device transmits to a new access network device subsequently received packets. If the received packets are to be dropped after all, the received packets are dropped before the storage in the transmission queue according to the above queue management method, thus saving resources.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the drawings.

Figure 2:
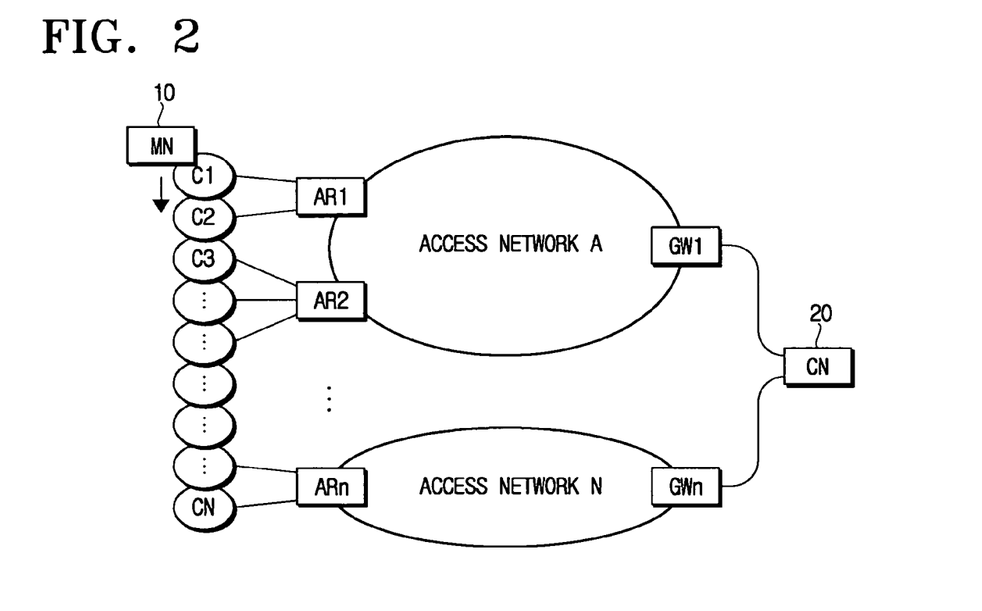
FIG. 2 illustrates a handover of the mobile node in the wireless access network.

FIG. 2 is a schematic diagram illustrating a communication path between a mobile node (MN) 10 and a correspondent node (CN) 20, and a handover in a certain direction. Referring to FIG. 2, connection of nodes through a network requires access to a certain network through an access network device. A device, which the node accesses directly, may be an access router (AR) in general. A gateway or a bridge located at an end of the network may be the access network device. The AR is shown in FIG. 2 as an example of the access network device.

Still referring to FIG. 2, the MN 10 accesses the access network A through the AR1 and communicates through the first gateway (GW) with the CN 20 in an external network.

If packets are transmitted from the CN 20 destined for the MN 10 or packets are transmitted from the MN 10, the AR1 stores the packets to be transmitted in a queue and forwards the packets in sequence to its destination.

In a real-time packet traffic transferring, the packets have to be transmitted within a real-time traffic delivery deadline set to a destination node. If not, the packets are dropped at the destination node. According to an exemplary embodiment of the present invention, it is predicted whether the transmission within the delivery deadline is possible. If the transmission is impossible, the packets are dropped instead of being stored in the queue.

If the MN 10 and the CN 20 are connected to each other through a plurality of networks, a maximum delay time is determined in the current access network device by considering a time required for passing through each network, to thus predict the transmission feasibility. In general, a queuing time for storing packets in a transmission queue and transmitting the packets in a storage order takes up most of the time in the processing of the packets in the access network device. Accordingly, the maximum delay time of the access network device depends on the number of packets received and stored in a current buffer, that is, because of a queue length. Hereinafter, the queue length corresponding to the maximum delay time refers to a maximum queue length.

The maximum queue length may be measured using a delivery deadline assigned for a corresponding packet for real-time transmission packet, a delay time from the packet transmission until the packet reception to the current access network device, and a transmission rate of the packet. The delivery deadline or the delay time may be informed separately from a network administrator, or, determined approximately using a statistical method.

When the maximum queue length is measured, the maximum queue length is compared with a current queue length of the transmission queue. As aforementioned, the transmission queue is a buffer structure storing the packets in a sequential order of reception. Hence, a required packet is transmitted after all pre-stored packets are transmitted. The queuing time, for the transmission of the real-time transmission packet stored in the transmission queue, can be predicted using the queue length, namely, using packet occupancy with respect to the buffer. If the current queue length is greater than the maximum queue length, it is predicted that the packet is likely to exceed the delivery deadline upon arriving at the destination node because the delay time give to the access router device is exceeded already. According to an exemplary embodiment of the present invention, the access network device does not store such packets in the transmission queue but drops the packets right away.

Still referring to FIG. 2, the MN 10 can move in a certain direction. The MN 10 performs a handover during movement to maintain the current communication status. If the MN 10 moves from a C1 area toward a CN area, specifically, if the MN 10 moves from the C1 area into the C2 area, the handover is performed between areas covered by the same AR1. If the MN 10 moves from the C2 area into the C3 area, the handover is performed between the AR1 and the AR2.

If the handover to another AR initiates, a packet destined for the MN 10 is transmitted to the former AR1 until the completion of the handover. The former AR1 transmits to the new AR2 packets that are received after the handover initiation and destined for the MN 10.

Upon detecting the handover, the MN 10 transmits to the former AR1 a certain short packet indicating the beginning of the handover (hereinafter, referred to as a handover initiation packet). Upon receiving packets received after the reception of the handover initiation packet, the former AR1 determines whether it is feasible to deliver the packets within the delivery deadline. The former AR1 stores in the transmission queue only the feasible packets and transmits the stored packets to the new AR2. When the MN 10 determines the completion of the handover, the MN 10 transmits to the former AR1 a certain short packet indicating the completion of the handover (hereinafter, referred to as a handover completion packet).

After receiving the handover completion packet, the former AR1 drops all packets destined for the MN 10. As a result, the queue is managed with efficiency.

Figure 3:
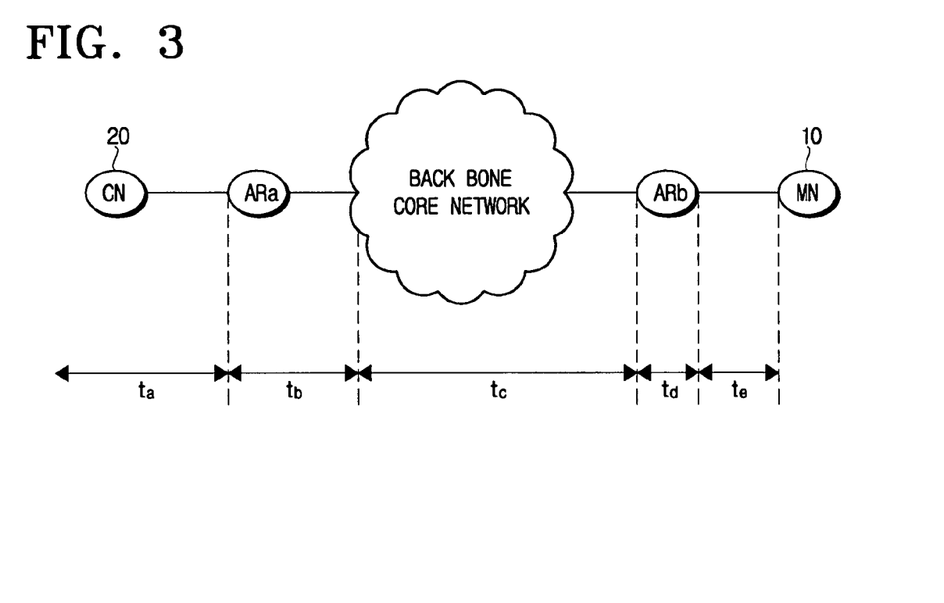
FIG. 3 is a schematic diagram illustrating a time required for each operation on communication path between the mobile node and the correspondent node.

FIG. 3 illustrates the delay time required on a communication path between the MN 10 and the CN 20 through a certain access network and a backbone core network according to an embodiment of the present invention. The MN 10 and the CN 20 access the access network through ARa and ARb, respectively. It is assumed in this embodiment that the CN 20 is a transmission side.

Referring to FIG. 3, it takes $t_a$ for the CN 20 to process a packet, $t_b$ is a delay time at the transmission access network connected to the CN 20, $t_c$ is a delay time at the backbone core network, $t_d$ is a processing time at the access network accessed by the MN 10, and $t_e$ is a delivery delay time within a radio area between the reception ARb and the MN 10. Therefore, a total delay time is $t_a+t_b+t_c+t_d+t_e$. As explained above, if the total delay time exceeds the delivery deadline of the packets for the real-time traffic, the reception MN 10 drops the received packet since the packet is unavailable.

Upon receiving the packet destined for the MN 10, the reception ARb stores the received packet in the transmission queue and then, transmits the stored packet in the sequential order of storage. Accordingly, $t_d$ significantly relies on the queuing time. Since the queuing time depends on the current queue length, the current queue length affects the maximum delay time allowed at the reception ARb. The delivery deadline can be predicted by comparing the maximum queue length and the current queue length.

The reception ARb, which is implemented under the ARQ mechanism, has a retransmission queue for transmitting a duplicate of the packet. If the MN 10 cannot receive a packet normally, the reception ARb retransmits the duplicate of the packet. Such a retransmission requires additional time.

The maximum queue length required by the reception ARb implemented under the ARQ mechanism is calculated based on the following equation considering each delay time of FIG. 3.

$$L_{th} = \frac{(\tau - t_a - t_b - t_c - t_d - t_e - t_f) * r}{k * N} \quad \text{[Equation 1]}$$

In Equation 1, $L_{th}$ represents the maximum queue length of the access network device, k represents a length of the packet, r represents a transmission rate of the packet, and $\tau$ represents a transmission deadline of the real-time transmission packet. $t_a$, $t_b$, $t_c$, $t_d$, and $t_e$ are explained above, N represents the number of the retransmission under the ARQ mechanism, and $t_f$ represents the delay time due to the retransmission.

The maximum queue length, which is calculated based on Equation 1, is compared with the current queue length so as to predict the transmission feasibility of the real-time transmission packet within the delivery deadline.

Figure 4:
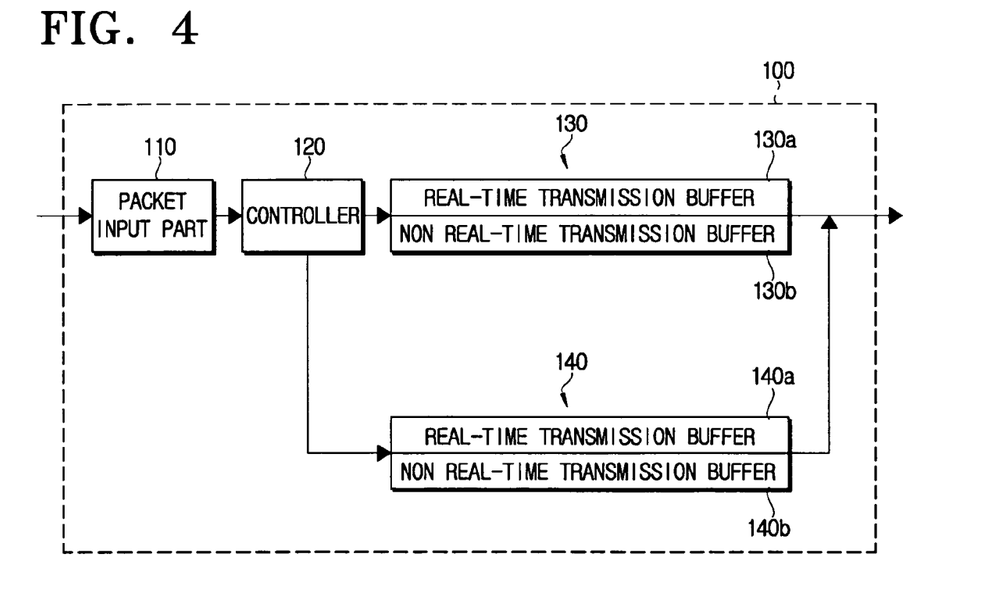
FIG. 4 is a block diagram of an access network device according to an exemplary embodiment of the present invention.

FIG. 4 is a block diagram of an access network device 100 managing the queue according to an embodiment of the present invention. Referring to FIG. 2, the access network device 100 is used in the network under the ARQ mechanism, and includes a packet input part 110, a controller 120, a transmission queue 130, and a retransmission queue 140.

The packet input part 110 receives packets from the MN 10 or packets destined for the MN 10.

The transmission queue 130 is a buffer storing received packets in sequence. The transmission queue 130 includes a real-time transmission buffer 130a for real-time traffic and a non real-time transmission buffer 130b for non real-time traffic. The real-time transmission buffer 130a stores packets to be delivered in real-time.

The retransmission queue 140 stores duplicates of the packets stored in the transmission queue 130. The retransmission queue 140, like the transmission queue 130, includes a real-time retransmission buffer 140a for real-time traffic and a non real-time retransmission buffer 140 for non real-time traffic. The transmission queue 130 drops a transmitted packet after the transmission to the MN 10. If the MN 10 cannot receive a packet normally, its duplicate stored in the retransmission queue 140 is transmitted, thus overcoming the packet transmission errors on the wireless link.

When the real-time transmission packet is stored, the controller 120 determines whether the packet is valid at the destination node, that is, whether the packet can be transmitted to the destination node within a certain delivery deadline. The controller 120 controls the storing of only the packets feasible to arrive within the delivery deadline, in the real-time transmission buffer 130a and the real-time retransmission buffer 140a.

To determine the feasibility of the packet arrival, the maximum queue length is determined using the delivery deadline set for the transmitted packet, the total delay time until the packet is received to the current access network device 100 after the transmission from the transmission side, the packet transmission rate, the packet length, and the maximum number of the retransmission. The maximum queue length is calculated in correspondence with the maximum time delayable at the current access network device 100. The longer the maximum queue length, the longer the delayable time of the current access network device 100. The maximum queue length is calculated based on Equation 1.

The delivery deadline, the total delay time, and the transmission rate may be determined using a statistical method, or informed from a network administrator, or calculated by switching a test packet with the CN 10 and measuring the switch time.

When the maximum queue length is calculated, the controller 120 compares the maximum queue length with the current queue length. If the current queue length is greater than the maximum queue length, namely, if there are more than a certain number of other packets formerly stored and transmitted according to priority, the packet is not stored in the transmission queue 130 but is dropped immediately even if the received real-time transmission packet is stored in the real-time transmission buffer 130a and transmitted, because the delivery deadline is to exceed when the destination node receives the packet.

If the MN connected to the access network device 100 performs a handover, the handover initiation packet is transmitted from the MN and is received by the packet input part 110. The controller 120 also predicts if the delivery deadline would expire with respect to real-time transmission packets received after the reception of the handover initiation packet. If it is determined that it is feasible to transmit the packet within the delivery deadline, the packet is transmitted to a new access network device. The new access network device may be discovered using a Candidate Access Router Discovery (CARD) algorithm which is suggested by IETF (Internet Engineering Task Force) Seamoby Working Group draft-ietf-seamoby-card-protocol-04.txt or other algorithms.

Upon receiving the handover completion packet, the controller 120 drops the packets if receiving the packets destined for the same node.

Figure 5:
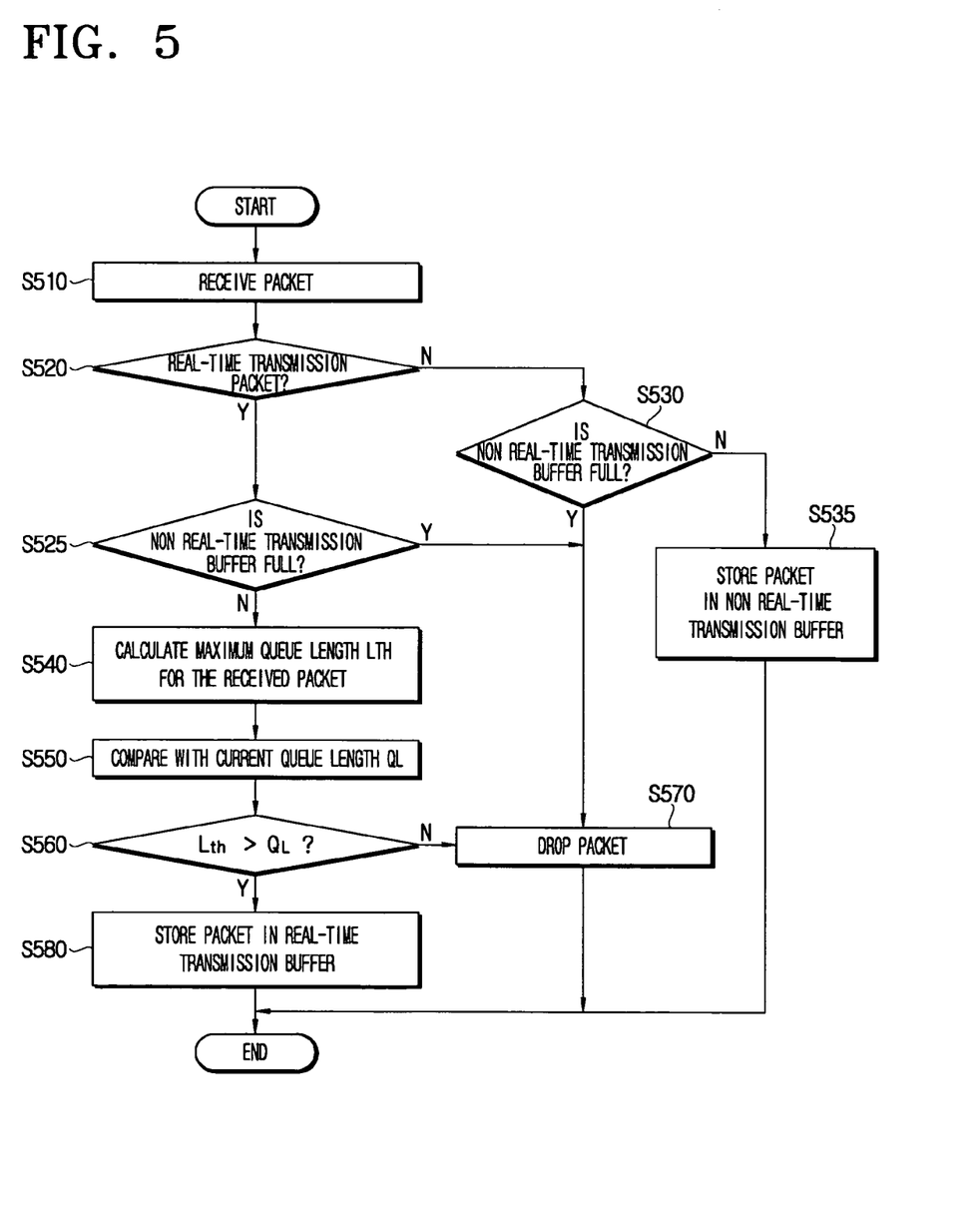
FIG. 5 is a flowchart illustrating a queue management method of the access network device according to an exemplary embodiment of the present invention.

FIG. 5 is a flowchart of operations of a queue management method of the access network device according to an embodiment of the present invention. Referring to FIG. 5, when a packet destined for a certain node is received at operation S510, the access network device determines whether the received packet is for real-time transmission at operation S520.

If the received packet is for non real-time transmission, it is determined whether the non real-time transmission buffer 130b is full at operation S530. If so the transmission buffer is full, the received packet is dropped at operation S570, or, if the transmission buffer is not full, the received packet is stored in the non real-time transmission buffer 130b. The stored packet is transmitted upon request or according to delivery time.

If the received packet is for real-time transmission, it is determined whether the real-time transmission buffer 130a is full at operation S525. If so, the maximum queue length $L_{th}$, allowed to the current access network device, is calculated at operation S540. The maximum queue length is calculated based on Equation 1.

The calculated maximum queue length is compared with the current queue length $Q_L$ at operation S550. The maximum queue length corresponds to the maximum time delayable by the current access network device, and the current queue length $Q_L$ corresponds to a real delay time of the current access network device.

If the current queue length $Q_L$ is greater than or equal to the maximum queue length $L_{th}$ at operation S560, the packet is dropped right away instead of being stored in the real-time transmission buffer 130a at operation S570, even if the packet arrives at the destination node the packet would be dropped in the end.

If the current queue length $Q_L$ is less than the maximum queue length $L_{th}$ at operation S560, the packet is stored in the real-time transmission buffer 130a and transmitted in order of storage at operation S580.

According to the ARQ mechanism, the packet may be stored in the real-time retransmission buffer 140a as well as in the real-time transmission buffer 130a. The packet stored in the real-time retransmission buffer 140a is transmitted when a packet indicating the normal reception of the related packet is not received from the destination node within a certain time-out.

Figure 6:
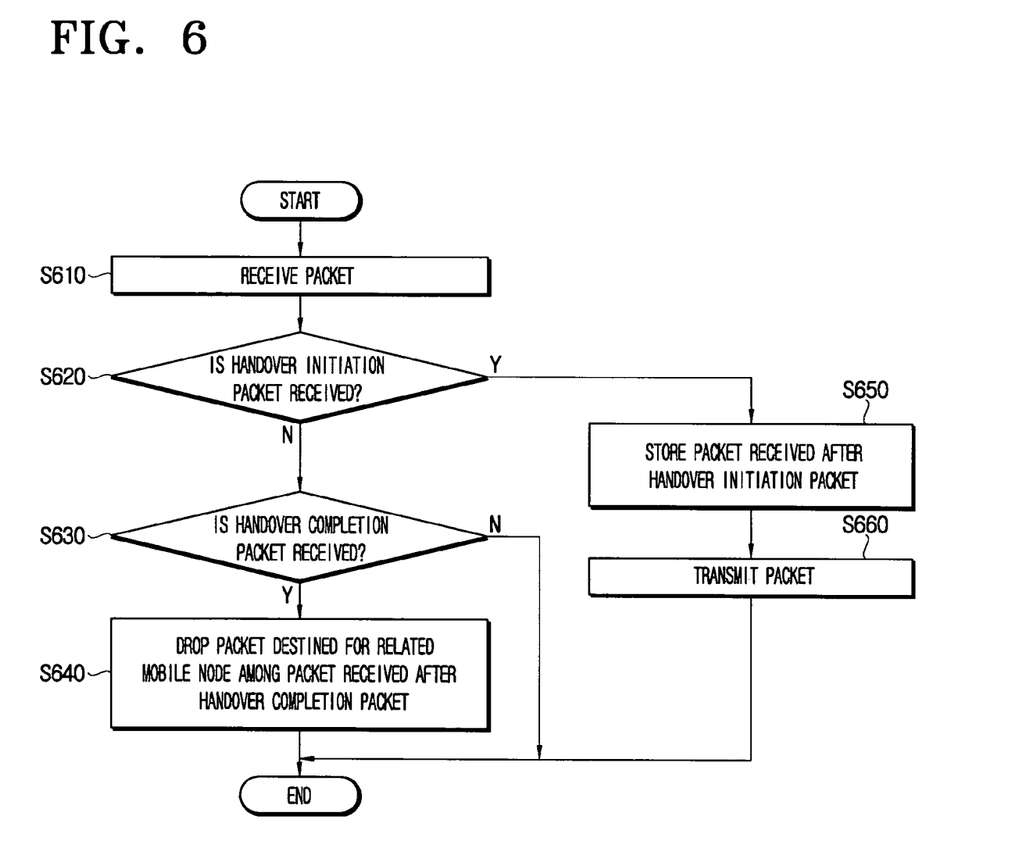
FIG. 6 is a flowchart illustrating a queue management method according to an exemplary embodiment of the present invention when a handover occurs in the mobile node connected to the access network device.

FIG. 6 is a flowchart of the queue management method when the MN connected to the access network device 100 performs the handover according to an embodiment of the present invention. Referring to FIG. 6, when a packet is received at operation S610, the access network device 100 determines whether the received packet is the handover initiation packet at operation S620.

If so, the following received packets are stored in the transmission queue at operation S650 and delivered to a new access network device at operation S660. An access network device under the ARQ mechanism stores duplicates of the packets in the retransmission queue at operation S650. The packets are delivered to the new access network device following the operations of FIG. 5. Concretely, the maximum queue length of the real-time transmission packet is calculated and compared with the current queue length so as to predict the transmission feasibility within the delivery deadline. If determined infeasible, the packet is dropped instead of being stored in the transmission queue.

It is determined whether the handover completion packet is received at operation S630. If so, it is determined whether the packet destined for the MN among the following received packets is received and the packet is dropped at operation S640.

Consequently, the above queue management prevents unnecessary packet storage and packet delivery, thus saving resources.

In light of the foregoing, it is possible to predict whether the real-time transmission packet arrives at the destination node within the delivery deadline by considering the delay time of the access network device after the reception of the packet until the transmission of the packet. If the packet is unable to arrive to the destination node within the delivery deadline, the access network device drops the packet right away without transmitting the packet because the packet is to be dropped at the destination node. Therefore, resources such as storage capacity of the transmission queue of the access network device and bandwidth used for the transmitted packet, are saved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A queue management method of an access network device storing a received packet in a transmission queue and transmitting the stored packet to a destination node in a storage order, the method comprising:

determining whether the packet is transmittable within a delivery deadline allowed for real-time traffic to the destination node by the access network device; and dropping the packet instead of storing the packet in the transmission queue when determined that the packet is not transmittable within the delivery deadline by the access network device, wherein the determining of whether the packet is transmittable comprises:

calculating a maximum allowable queue length of the access network device for the transmission within the delivery deadline;

comparing the maximum allowable queue length with a current queue length of the transmission queue; and determining the packet transmission infeasibility within the delivery deadline if the current queue length is greater than or equal to the maximum queue length, and wherein the maximum allowable queue length is calculated by waiting a predetermined period of time before the retransmission.

2. The queue management method of claim 1, wherein the maximum allowable queue length is calculated using the delivery deadline, a total delay time from the packet transmission until the packet reception, and a transmission rate of the packet.

3. The queue management method of claim 1, further comprising:

storing the packet in the transmission queue when determined that the packet transmission is feasible within the delivery deadline by the access network device;

storing a duplicate of the packet in a retransmission queue separately provided by the access network device; and transmitting the duplicate stored in the retransmission queue when a response packet indicating the destination node normally receives the packet is not received within a certain time after the packet transmission by the access network device.

4. A queue management method of an access network device providing a mobile node with access to a network and, in which if a packet destined for the mobile node is received, the access network stores the packet in a transmission queue and transmitting the stored packet to the mobile node in a storage order, the method comprising:

the access network device receiving from the mobile node a handover initiation packet indicating a beginning of a handover when the handover of the mobile node initiates;

the access network device transmitting the packet to a new access network device when the packet destined for the mobile node is received after the reception of the handover initiation packet;

determining whether the packet is transmittable within a delivery deadline allowed for real-time transmission at the mobile node when the packet is for real-time transmission; and dropping the packet instead of storing the packet in the transmission queue when determined that the packet transmission is infeasible within the delivery deadline, wherein the determining of whether the packet is transmittable comprises:

calculating a maximum queue length allowed of the access network device for the transmission within the delivery deadline;

comparing the maximum queue length with a current queue length of the transmission queue; and determining the packet transmission within the delivery deadline to be infeasible if the current queue length is greater than or equal to the maximum queue length, and wherein the maximum allowable queue length is calculated by waiting a predetermined period of time before the retransmission.

5. The queue management method of claim 4, further comprising:

the access network device receiving from the mobile node a handover completion packet indicating the handover is completed; and dropping a packet instead of storing the packet in the transmission queue when the packet destined for the mobile node is received after the reception of the handover completion packet.

6. The queue management method of claim 5, wherein the maximum queue length is calculated using the delivery deadline, a total delay time from the packet transmission until the packet reception, and a transmission rate of the packet.

7. The queue management method of claim 6, further comprising:

storing the packet in the transmission queue when determined that the packet transmission is feasible within the delivery deadline;

storing a duplicate of the packet in a retransmission queue separately provided; and transmitting the duplicate stored in the retransmission queue when a response packet indicating the destination node normally receiving the packet is not received within a certain time after the packet transmission.

8. An access network device comprising:

a packet input part receiving a packet destined for a certain node;

a transmission queue storing the packet received through the packet input part and transmitting the packet in a sequential order of the storage;

a controller dropping the packet instead of storing the packet in the transmission queue when the received packet is for real-time transmission and a prediction of infeasibility to transmit the packet within a delivery deadline allowed for the real-time transmission packet to a destination node has been made, wherein the controller calculates a maximum queue length of the packet transmission within the delivery deadline, compares the calculated maximum queue length with a current queue length, and determines the packet transmission within the delivery deadline to be infeasible if the current queue length is greater than or equal to the maximum queue length; and a retransmission queue storing a duplicate of the packet and retransmitting the duplicate to the destination node when a response packet indicating the destination node normally receiving the packet is not received within a certain time, wherein the controller calculates the maximum allowable queue length by waiting a predetermined period of time before the packet retransmission of the retransmission queue.

9. The access network device of claim 8, wherein the controller calculates the maximum queue length using the delivery deadline, a total delay time from the packet transmission until the packet reception, and a transmission rate of the packet.

10. An access network device providing a mobile node with access to a certain network, the device comprising:
a packet input part receiving a packet destined for the mobile node and a handover initiation packet indicating a handover initiation of the mobile node;
a transmission queue storing the packet received after the reception of the handover initiation packet and transmitting the packet to a new access network device handover from the mobile node in a storage order;
a controller dropping the packet instead of storing the packet in the transmission queue when the received packet is for real-time transmission and a prediction of infeasibility to transmit the packet within a delivery deadline allowed for the real-time transmission of the packet from a destination node has been made,
wherein the controller calculates a maximum queue length allowed for the packet transmission within the delivery deadline, compares the calculated maximum queue length with a current queue length, and determines the packet transmission within the delivery deadline to be infeasible if the current queue length is greater than or equal to the maximum queue length; and
a retransmission queue storing a duplicate of the packet and retransmitting the duplicate to the destination node when a response packet indicating the destination node normally receiving the packet has not been received within a certain time,
wherein the controller calculates the maximum allowable queue length by waiting a predetermined period of time before the packet retransmission of the retransmission queue.

11. The access network device of claim 10, wherein the controller drops the received packet instead of storing the packet in the transmission queue if the packet destined to the mobile node is received after the packet input part receives from the mobile node a handover completion packet indicating that the handover is completed.

12. An access network device comprising:
a packet input part receiving and/or transmitting packets to and/or from a node;
a transmission queue storing the packets in a sequential order and dropping the packets after transmitting the packets to the node when the received packets are for real-time transmission and when predicted that the packets are not transmittable to the node within a predetermined time;
a retransmission queue storing duplicate packets of the packets stored in the transmission queue, wherein the duplicate packets are transmitted to the node if the packets stored in the transmission queue are not received by the node; and
a controller controlling the storing of the packets in the sequential order based on whether the packets are transmittable to the node within the predetermined time,
wherein the controller calculates the maximum allowable queue length by waiting a predetermined period of time before the packet retransmission of the retransmission queue, and wherein the controller calculates a maximum queue length of the packets, compares the calculated maximum queue length with a current queue length, and determines whether the packets are transmittable within the predetermined time.

13. The access network device of claim 12, wherein the transmission queue further includes a real-time transmission buffer storing the packets to be delivered in real-time and a non-real time transmission buffer storing the packets to be delivered in non real-time.

14. The access network device of claim 12, wherein the retransmission queue further includes a real-time transmission buffer and a non-real time transmission buffer storing the duplicate packets.

* * * * *